United States Patent [19]

Krueger et al.

[11] 4,043,930

[45] Aug. 23, 1977

[54] 1,4-BIS-FORMYL CYCLOHEXANE POLYCARBOXYLIC ACIDS, PROCESS OF MAKING SAME, AND COMPOSITIONS AND METHODS OF USING SAME

[75] Inventors: Friedrich Krueger, Edingen; Dieter Palleduhn, Mannheim, both of Germany

[73] Assignee: Joh. A. Benckiser GmbH, Ludwigshafen (Rhine), Germany

[21] Appl. No.: 594,259

[22] Filed: July 9, 1975

[30] Foreign Application Priority Data

July 9, 1974 Germany ............................ 2432832

[51] Int. Cl.$^2$ .......................... C11D 1/00; C02B 1/18; C02B 5/06; C07C 53/00
[52] U.S. Cl. ................................... 252/89 R; 252/82; 252/179; 252/180; 210/58; 260/514 K
[58] Field of Search ................. 260/514 K; 252/179, 252/89, 180, 82; 210/58

[56] References Cited

U.S. PATENT DOCUMENTS

| | | | |
|---|---|---|---|
| 3,242,206 | 3/1966 | Volkenburgh et al. | 260/537 |
| 3,629,291 | 12/1971 | Nohe | 260/514 K |

OTHER PUBLICATIONS

Preparative Organic Chemistry, "Oxidative Degradation of Olefins" Weygand & Hilgetag 1973.

*Primary Examiner*—Mayer Weinblatt
*Attorney, Agent, or Firm*—Erich M. H. Radde

[57] ABSTRACT

Novel 1,4-bis-formyl cyclohexane polycarboxylic acids have proved of considerable value as agents capable of preventing and inhibiting scale formation in aqueous media. Especially valuable scale formation inhibiting and complexing agents are 1,4-bis-formyl cyclohexane-1,2,3,6-tetracarboxylic acid and 1,4-bis-formyl cyclohexane-1,2,3-tricarboxylic acid. They are prepared by oxidizing the corresponding bicyclo-(2,2,2)-octene(7) polycarboxylic acid-2,3-anhydrides. The novel nitrogen- and phosphorus-free acids have a surprisingly high threshold effectiveness and can be used in detergent and cleaning solutions in combination with conventional detergents and cleaning agents.

11 Claims, 1 Drawing Figure

THIN LAYER CHROMATOGRAM
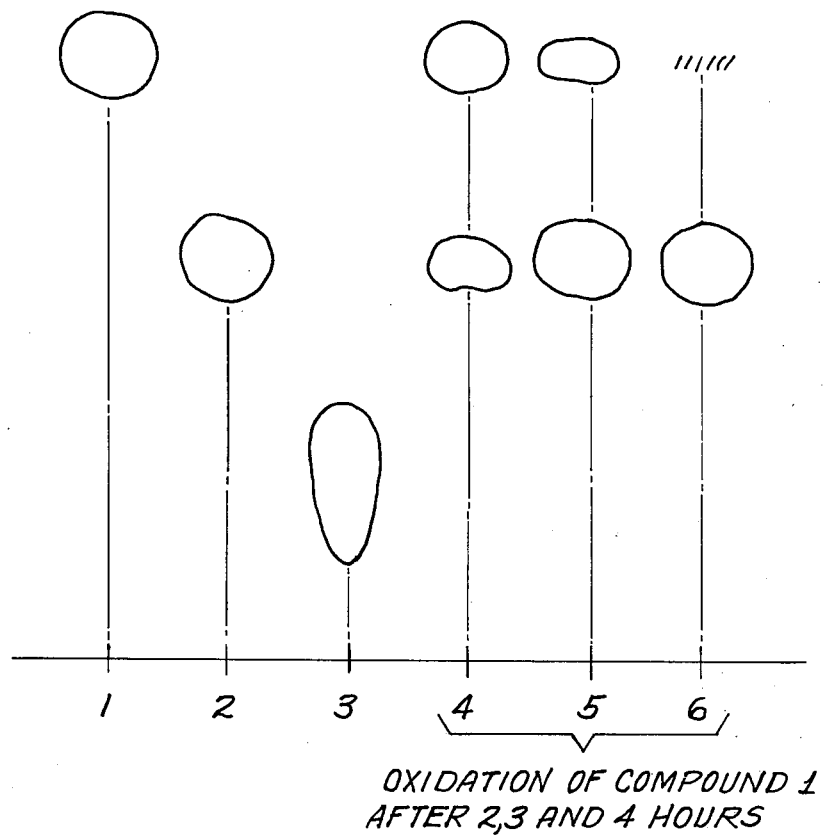
OXIDATION OF COMPOUND 1
AFTER 2, 3 AND 4 HOURS
LEGEND
1. BICYCLO-(2,2,2)-OCTANE (7)-2,3,4,5-TETRACARBOXYLIC ACID-2,3-ANHYDRIDE
2. 1,4-BIS-FORMYL CYCLOHEXANE -2,3,4,5-TETRACARBOXYLIC ACID
3. CYCLOHEXANE -1,2,3,4,5-PENTACARBOXYLIC ACID

1,4-BIS-FORMYL CYCLOHEXANE POLYCARBOXYLIC ACIDS, PROCESS OF MAKING SAME, AND COMPOSITIONS AND METHODS OF USING SAME

BACKGROUND OF THE INVENTION

1. Field of the Invention

The present invention relates to 1,4-bis-formyl cyclohexane polycarboxylic acids, to a process of producing same, and to compositions for and methods of using said acids for preventing scale-forming deposits.

2. Description of the Prior Art

It is known to employ polyphosphates and more recently phosphonic acids for preventing precipitation of alkaline earth metal ions. Two groups of phosphonic acids have proved to be especially effective for this purpose, namely the amino alkylene phosphonic acids such as, for instance, nitrilo tris-(methylene phosphonic acid) and the alkane diphosphonic acids such as, for instance, hydroxy ethane diphosphonic acid. The use of phosphonic acids is preferred over that of polyphosphates because the former are stable against hydrolysis and, therefore, fully retain their effectiveness in acid as well as alkaline media.

It is also known that when using the phosphonic acids, even amounts lower than the stoichiometrically required amounts are sufficient in order to retain in solution the hardness causing agents in water. This phenomenon is generally known as "threshold effect" or also as "seeding effect" (Ralston "Journal Petroleum Technology," vol. 21 (1969), pp. 1029 to 1036).

Because nitrogen and phosphorus containing compounds have been made responsible for the eutrophication of rivers and lakes, many attempts have been made to find new nitrogen- and phosphorus-free compounds having such threshold effectiveness.

Heretofore mainly two classes of compounds which contain neither nitrogen nor phosphorus and which are effective in amounts below the stoichiometrically required amounts have become known. Such compounds are, on the one hand, polymers of the most diverse composition (Elliot "Desalination," vol. 8 (1970), p. 232) and, on the other hand, modified polysaccharides, for instance, starches which have been degraded by acids or by oxidation (U.S. Pat. No. 3,791,978).

Both types of agents with threshold effectiveness, however, can be used only in higher concentrations than the phosphonic acids.

Furthermore, it is also known that the cyclohexane-1,2,3,4,5-pentacarboxylic acid has such an effectiveness (U.S. Pat. No. 3,784,469).

SUMMARY OF THE INVENTION

It is an object of the present invention to provide novel, nitrogen- and phosphorus-free compounds which have an excellent threshold effectiveness in reducing or eliminating scale formation and deposition of the ions causing hardness of the water, i.e. which are effective in amounts lower than the stoichiometrically required amounts.

Another object of the present invention is to provide a simple and effective process of producing such nitrogen- and phosphorus-free compounds with a high threshold effectiveness.

A further object of the present invention is to provide a highly effective composition to be added to water and aqueous media in order to prevent or at least considerably inhibit formation of scale deposits and incrustations on the surface of containers, pipelines, heating coils, and the like.

Still another object of the present invention is to provide an effective method of controlling scale formation without the use of nitrogen- and/or phosphorus containing compounds.

Other objects of the present invention and advantageous features thereof will become apparent as the description proceeds.

In principle the effective scale formation inhibiting compounds according to the present invention which are free of nitrogen and phosphorus, are 1,4-bis-formyl cyclohexane polycarboxylic acids of the following Formula I.

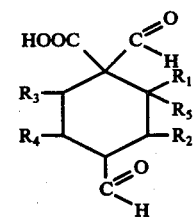

I

In said formula the substituents $R_1$, $R_2$, $R_3$, and $R_4$ are hydrogen or the carboxyl group, at least one of said substituents being a carboxyl group and $R_5$ is hydrogen or the methylene carboxyl group ($-CH_2COOH$).

Compounds according to this invention are, for instance, the following compounds:

1,4-Bis-formyl cyclohexane-1,2,3,6-tetracarboxylic acid of Formula II:

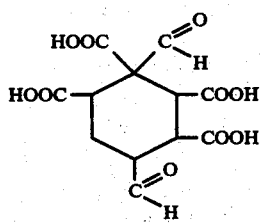

II 1,4-Bis-formyl cyclohexane-1,2,3-tricarboxylic acid of Formula III:

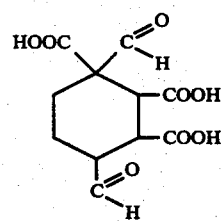

III 1,4-Bis-formyl-1,2,6-tricarboxy-2-methylene carboxylic acid of Formula IV:

IV

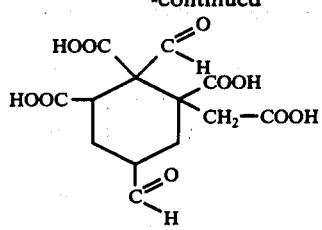

Depending upon the pH-value of their solutions the new compounds are present therein also in the form of their acylal compounds. Thus, for instance, the 1,4-bis-formyl cyclohexane-2,3,4,5-tetracarboxylic acid of Formula II can be present in the following acylal forms IIa or IIb:

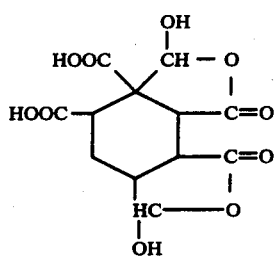

These forms, however, are only different states of one and the same compound so that for simplicity's sake, all these compounds are comprised by the term 1,4-bis-formyl cyclohexane polycarboxylic acids and it is understood that the last mentioned designation comprises also all possible states of said compounds.

The high effectiveness of the compounds according to the present invention is quite surprising. Especially in view of the fact that the corresponding polycarboxylic acids without aldehyde groups such as the cyclohexane-1,2,3,4-tetracarboxylic acid or the cyclohexane-1,2,3-tricarboxylic acid have only a low threshold activity. It is not known from the literature and it could also not be expected that introduction of two aldehyde groups into such cyclohexane polycarboxylic acid would result in the excellent threshold effectiveness observed with the novel compounds.

Furthermore, it was found that, for instance, the isomeric 1,4-bis-formyl cyclohexane-2,3,5,6-tetracarboxylic acid of Formula V, which is isomer to the compound of Formula II and the 1,4-bis-formyl cyclohexane-2,3,5-tricarboxylic acid of Formula VI, which is isomer to the compound of Formula III

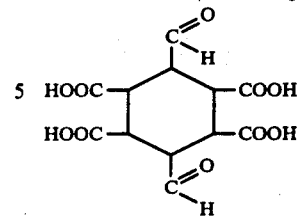

do not have any threshold activity. Therefore, it can be assumed that the excellent threshold activity is to be attributed to the simultaneous presence of an aldehyde group and a carboxyl group at one and the same carbon atom of the cyclohexane ring.

The following comparative data illustrate the excellent threshold and seeding effectiveness of the novel compounds according to the present invention in comparison to known cyclohexane polycarboxylic acid as well as to other known nitrogen- and phosphorus-free compounds.

To determine the threshold activity, i.e. the seeding effect, a predetermined amount of the compound to be tested is dissolved in a 1,000 ml. glass beaker in 1 l. of water of 17° German hardness. 12 g. of sodium hydroxide are added thereto. The glass beaker is covered with a watch glass and is allowed to stand at room temperature. It was then investigated whether crystals had been deposited on the wall of the glass beaker or on a glass rod placed into the beaker.

The following Table 1 shows the seeding or threshold effect of the compounds according to the present invention when compared with other nitrogen- and phosphorus-free compounds.

TABLE 1

| Compound | Amount mg. | 2 | 4 | 6 | 8 | 10 | 12 | 14 | 16 |
|---|---|---|---|---|---|---|---|---|---|
| Compound of Formula II | 10 | 0 | 0 | 0 | 0 | 0 | 0 | 0 | 0 |
| Compound of Formula V (isomer of Compound of Formula II) | 10 | — | — | — | — | — | — | — | — |
| Cyclohexane-1,2,3,4,5-pentacarboxylic acid | 10 | 0 | 0 | 0 | — | — | — | — | — |
| Compound of Formula III | 10 | 0 | 0 | 0 | 0 | — | — | — | — |
| Compound of Formula VI (isomer of compound of Formula III | 10 | — | — | — | — | — | — | — | — |
| Cyclohexane-1,2,3,4-tetracarboxylic acid | 10 | — | — | — | — | — | — | — | — |
| Polyacrylic acid | 10 | — | — | — | — | — | — | — | — |
| Dextrines | 10 | 0 | — | — | — | — | — | — | — |

In said Table 1:
0 indicates that no precipitate is formed on the glass rod and/or on the wall of the beaker.

— indicates precipitation of calcite crystals.

Formation of incrustations on the surface of the containers, pipelines, heating coils, and the like, which are in contact with water, is prevented by using the novel compounds according to the present invention. Thus, for instance, the use of the new compounds is especially advantageous in automatic bottle rinsing machines or for cleaning tanks and containers. In these operations scale formation and precipitation occurs very readily especially on subsequent rinsing with water, i.e. at that stage of the cleaning process at which only traces of the cleaning agent are present, which traces are diluted with large amounts of water and are then removed by rinsing. Such scale formation and deposition is prevented by the addition of small amounts, i.e. threshold amounts of the new compounds according to the present invention to the diluted rinsing solutions. If necessary, small additional doses may be added to solutions applied to zones which are especially exposed to scale deposition.

The compounds according to the present invention can be used in combination with conventional detergents and cleaning agents. They are well compatible with the conventional detergents and cleaning compounds and can be incorporated into solid and/or liquid compositions to be added to aqueous media regardless whether cleansing, rinsing, and washing is carried out in acid, alkaline, or neutral medium.

The novel compounds according to the present invention are produced by oxidation of compounds of the following Formula VII:

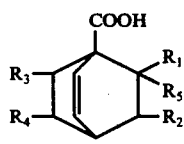

VII

In said Formula VII:
$R_1$, $R_2$, $R_3$ and $R_4$ indicate hydrogen or the carboxyl group and
$R_5$ indicates hydrogen or the methylene carboxyl group of the formula —$CH_2$—COOH.

In said Formula VII at least one of the substituents $R_1$, $R_2$, $R_3$, or $R_4$ is a carboxyl group. Two carboxyl groups in neighboring position can also be present in the form of anhydrides.

Nitric acid is preferably used in oxidizing agent. Usually the nitric acid concentration is between about 40 and about 68% and preferably about 60%. It has proved to be of importance to carry out the reaction in the absence of a catalyst.

The reaction is advantageously carried out in such a manner that 20 ml. of 30 ml. of 60% nitric acid are used for about 10 g. of the starting material and that the reaction mixture is heated for one hour to five hours, preferably for three hours to four hours to a temperature between about 60° and about 100° C. and preferably between 60° and 90° C. After cooling, the 1,4-bis-formyl cyclohexane polycarboxylic acid according to the present invention crystallizes in a good yield and quite pure and free of byproducts. A second fraction can be recovered by concentrating the filtered mother liquor in a vacuum.

If heating with nitric acid is carried out at a temperature above 120° C. for a longer period of time, for instance, for 15 hours to 20 hours, carbon dioxide is split off and the corresponding cyclohexane polycarboxylic acids are produced. In the presence of a catalyst, for instance, of ammonium vanadate or ammonium molybdate, oxidation to the cyclohexane polycarboxylic acid takes place already in about 2 to 3 hours.

The 1,4-bis-formyl cyclohexane-2,3,4,5-tetracarboxylic acid of Formula II according to the present invention is produced, for instance, by oxidation of bicyclo-(2,2,2)-octene(7)-2,3,4,5-tetracarboxylic acid-2,3-anhydride of Formula X. Said starting material can be prepared in a simple manner by producing the 2,3-dihydrophthalic acid of Formula IX from crotonaldehyde, maleic acid anhydride, and acetic acid anhydride and condensing the resulting 2,3-dihydrophthalic acid with maleic acid anhydride.

The reaction proceeds as illustrated according to the following formula scheme:

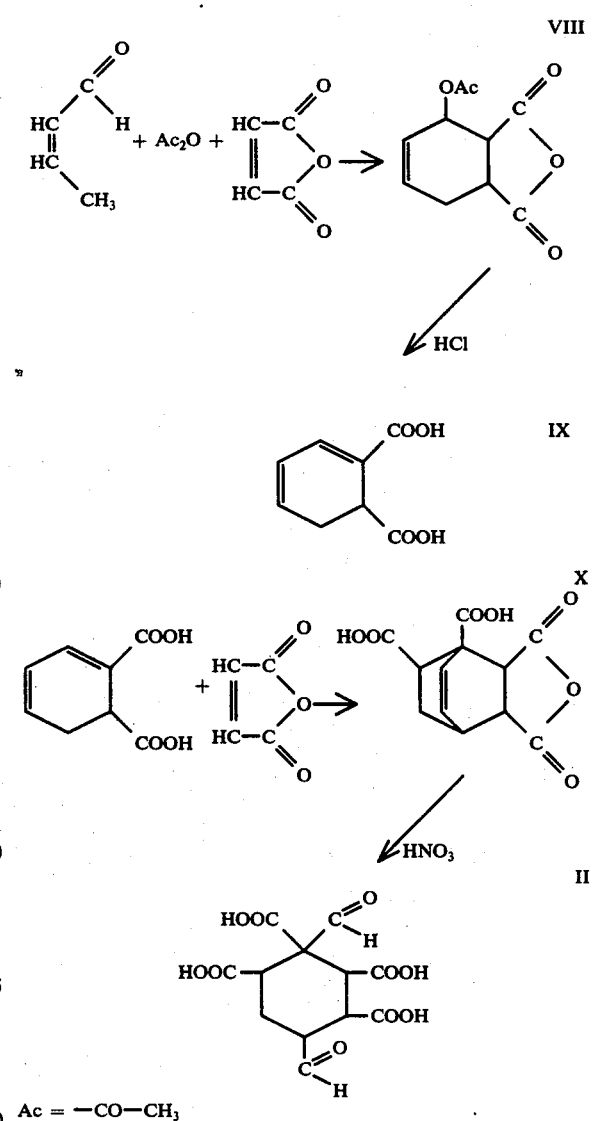

The other 1,4-bis-formyl cyclohexane polycarboxylic acids according to the present invention can be prepared in an analogous manner. For instance, the 1,4-bis-formyl cyclohexane-1,2,3-tricarboxylic acid of Formula III is obtained by oxidation of bicyclo-(2,2,2)-octene(7)-1,2,3-tricarboxylic acid-1,2-anhydride. The bicyclo-(2,2,2)-octene(7)-1,2,3-tricarboxylic acid-2,3-anhydride is prepared in an analogous manner as illustrated by the aforesaid formula diagram according to the process disclosed in "Liebig's Ann. Chem." vol. 565 (1949), p. 148.

BRIEF DISCLOSURE OF THE DRAWINGS

In the attached drawing

The FIGURE illustrates the thin layer of chromatogram of 1,4-bis-formyl cyclohexane-2,3,4,5-tetracarboxylic acid, of its starting material bicyclo-(2,2,2)-octene(7)-2,3,4,5-tetracarboxylic acid-2,3-anhydride, and of cyclohexane-1,2,3,4,5-pentacarboxylic acids as well as the chromatogram obtained after oxidation of the starting material for two, three, or four hours.

DESCRIPTION OF THE PREFERRED EMBODIMENTS

The following examples serve to illustrate the present invention without, however, limiting the same thereto:

EXAMPLE 1

1,4-Bis-formyl cyclohexane-2,3,4,5-tetracarboxylic acid of Formula II.

a. Preparation of the 2,3-dihydrophthalic acid of Formula IX.

A mixture of 102 g. (1 mole) of acetic acid anhydride, 70 g. (1 mole) of crotonaldehyde, 98 g. (1 mole) of maleic acid anhydride, and 1 g. of p-toluene sulfonic acid is stirred at room temperature. The temperature of the reaction solution increases to 50° – 55° C. and decreases again after a few minutes. Thereafter, the mixture is slowly heated in an oil bath while stirring until a bath temperature of 100° – 105° C. is attained. The reaction sets in under vigorous reflux. The temperature in the reaction solution increases to 125° – 140° C. The vigorous reaction is completed after 5 – 10 minutes. The reaction mixture is allowed to cool to about 80° C. 50 ml. of concentrated hydrochloric acid are added portion by portion and the mixture is heated under reflux at an oil bath temperature of 130° – 140° C. for 45 minutes while stirring. The resulting crude 2,3-dihydrophthalic acid of Formula IX crystallizes on standing overnight, is filtered off by suction, and is washed with 10% hydrochloric acid solution, until a colorless filtrate runs off.

Yield: 99 g., corresponding to a yield of 59% of the theoretical yield.

Melting Point: 178° – 180° C. on recrystallization from water.

The preparation of this compound is described in Example 1 of German Application as laid open to Opposition No. 1,020,626. The presence of a polymerization inhibitor such as methylene blue or thionine is recommended in said application in order to inhibit formation of polymer byproducts. It has been found, however, that the same result can be obtained without the addition of a polymerization inhibitor.

Furthermore, it has been found that, when proceeding as described in Example 1 of said application, bicyclo-(2,2,2)-octene(7)-2,3,5,6-tetracarboxylic acid-2,3;5,6-di-anhydride is formed as a by-product. Its formation is undesirable, on the one hand, because it decreases the yield of the main product and, on the other hand, because this by-product must be removed before heating the reaction solution with a mineral acid. This requires an additional working step.

In accordance with the present invention it has been found that said by-product is not produced if the reaction time is kept as short as possible. Thus a reaction time of 5 – 60 minutes and preferably 10 – 30 minutes is usually sufficient, while according to the above mentioned German application a reaction time of four hours is required.

The reaction mixture is subsequently heated directly with mineral acid, for instance, with hydrochloric acid, sulfuric acid, and others as described hereinabove.

It is, however, also possible first to distill off in a vacuum the reaction components of low boiling point, i.e. mainly glacial acetic acid and non-reacted acetic acid anhydride and then to heat the remaining reaction product, i.e. 3-acetoxy-1,2,3,6-tetrahydrophthalic acid anhydride of Formula VIII with mineral acid. When proceeding in this manner, hydrochloric acid is the preferred reactant because with sulfuric acid there is readily formed a smeary reaction product which can be purified only with difficulty.

b. Preparation of the bicyclo-(2,2,2-octene(7)-2,3,4,5-tetracarboxylic acid-2,3-anhydride of Formula X.

A mixture of 168 g. (1 mole) of 2,3-dihydrophthalic acid and 98 g. (1 mole) of maleic acid anhydride is heated lowly in an oil bath while stirring. The mixture starts to melt at an oil bath temperature of 140° C. and reaction sets in without further supply of heat, while foaming slightly. The temperature in the melt increases to 190° – 210° C. After a few minutes the temperature decreases and the melt starts to solidify to a hard mass.

Yield: 260 g., corresponding to a yield of 97.5% of the theoretical yield.

The resulting bicyclo-(2,2,2)-octene(7)-2,3,4,5-tetracarboxylic acid-2,3-anhydride of Formula X is recrystallized from acetic acid ester. Melting Point: 226° – 228° C.

On boiling with water and concentrating the aqueous solution by evaporation, the free tetracarboxylic acid is obtained from its mono-anhydride.

Potentiometric titration of the four carboxyl groups:
Weighed-in quantity: 100 mg.
Consumption: 14.0 ml. of N/10 sodium hydroxide solution (calculated 14.1 ml.).

c. 1,4-Bis-formyl cyclohexane-2,3,4,5-tetracarboxylic acid of Formula II.

700 ml. of 60% nitric acid are heated to 75° – 80° C. 360 g. of bicyclo-(2,2,2)octene(7)-2,3,4,5-tetracarboxylic acid-2,3-anhydride are added thereto within two hours while stirring. Vigorous evolution of nitrous gases takes place. The reaction mixture is heated subsequently at 75° –80° C. for about four hours. On standing in the cold, a crystalline reaction product precipitates from the clear reaction solution. It is filtered off by suction, washed with glacial acetic acid until a colorless filtrate runs off, and dried in a vacuum at 80° C.

Yield: 90 g. of an almost pure white compound.

On concentrating the mother liquor by evaporation to half its volume, 20 g. of a crystalline compound are additionally obtained.

It is also possible to combine steps (b) and (c) of the above described reaction procedure in order to simplify the synthesis of the desired compound.

For this purpose, 2,3-dihydrophthalic acid and maleic acid anhydride are reacted in a diluting solvent which is inert against nitric acid, for instance, in glacial acetic acid and the resulting reaction product is oxidized with nitric acid as described hereinabove without isolating the intermediate bicyclo-(2,2,2)-octene(7)-2,3,4,5-tetracarboxylic acid-2,3-anhydride.

The 1,4-bis-formyl cyclohexane-2,3,4,5-tetracarboxylic acid is recrystallized from glacial acetic acid.

Melting point: 212° – 124° C.

The progress of the oxidation reaction can readily be followed by thin layer chromatography. FIG. 1 illustrates the thin layer chromatogram obtained, for instance, when using DC readymade plates G 1,600 polyamide of the firm Schleicher und Schuell and, as solvent, a mixture of: acetonitrile (82 parts), formic acid (9 parts), acetic acid ethyl ester (9 parts) and water (30 parts). The chromatogram is developed by spraying with a 0.05% solution of bromocresol green.

It is readily evident from FIG. 1 that, almost four hours oxidation time, the starting material is almost completely converted into 1,4-bis-formyl cyclohexane-2,3,4,5-tetracarboxylic acid, but that no cyclohexane-1,2,3,4,5-pentacarboxylic acid has been formed.

Potentiometric titration of the 4 carboxyl groups:
Weighed-in quantity: 100 mg.
Consumption: 12.5 ml. of N/10 sodium hydroxide solution (calculated: 12.6 ml.).

The presence of reducing groups was detected with Fehling's solution as well as with ammoniacal silver salt solution.

These test results indicate that the compound is present in alkaline solution in its open form corresponding to Formula II.

The proton nuclear magnetic resonance spectrum which shows a considerable number of bands, proves that protons of free aldehyde groups are not present.

This finding can be explained by the aldehyde groups being present in neutral solution in hydrated form which agrees to the acylal form of Formula IIa or, respectively, IIb.

On heating with an excess of phenyl hydrazine on the water bath for 10 minutes, a yellow crystalline reaction product precipitates on cooling. After recrystallization from alcohol, a monophenylhydrazone is obtained.

Melting Point: 184° – 186° C.
Nitrogen found: 7.0%
Nitrogen calculated: 6.9%.

The cyclohexane pentacarboxylic acid is obtained by further oxidation of the 1,4-bis-formyl cyclohexane-2,3,4,5-tetracarboxylic acid with nitric acid in the presence of ammonium vanadate as catalyst.

Melting Point: 227° – 230° C. (Melting point according to the literature: 223° – 227° C.)

EXAMPLE 2

1,4-Bis-formyl cyclohexane-1,2,3-tricarboxylic acid of Formula III:

a. Preparation of bicyclo-(2,2,2)-octene(7)-1,2,3-tricarboxylic acid-2,3-anhydride.

This compound is prepared according to the description given in "Liebig's Ann. Chem." vol. 565, pp. 148 – 156 (1949).

b. Preparation of 1,4-bis-formyl cyclohexane-1,2,3-tricarboxylic acid.

20 ml. of 60% nitric acid are heated to 70° – 80° C. 10 g. of bicyclo-(2,2,2)-octene(7)-1,2,3-tricarboxylic acid-2,3-anhydride are added portion by portion thereto within 15 minutes while stirring. Stirring of the reaction mixture is continued at 70° – 80° C. for about two hours. The clear reaction solution is allowed to stand overnight in the refrigerator. The resulting crystals are filtered off by suction, washed with glacial acetic acid until a colorless filtrate runs off, and dried in a vacuum at 80° C.

Yield: 6.2 g.
Melting Point: 198° C.
Potentiometric titration of the 3 carboxyl groups:
Weighed-in quantity: 100 mg.
Consumption: 11.0 ml. of N/10 sodium hydroxide solution (calculated: 11.1 ml.).

Suitable cleansing solutions and detergents containing the compounds according to the present invention are composed, for instance, as follows:

EXAMPLE 3

40% of one of the compounds of Examples 1 or 2 according to the present invention,
10% of an antifoaming agent, 50% of water.
0.3% of this mixture are added to a 1% sodium hydroxide solution. The resulting cleansing solution can be used for rinsing bottles.

The antifoaming agent is sold under the trademark "PLURONIC L61" of the firm Wyandotte, PLURONIC L61 is a block copolymer of ethylene oxide with polypropylene glycol.

EXAMPLE 4

60% of a 67% gluconic acid solution,
10% of one of the compounds of Examples 1 or 2 according to the present invention, and
30% of water.
0.2% of this mixture are added to a 1% sodium hydroxide solution. The solution can be used for cleaning and rinsing bottles.

EXAMPLE 5

35% of sodium silicate,
3% of one of the compounds of Examples 1 or 2 according to the present invention,
20% of sodium carbonate,
17% of sodium hydroxide,
5% of a wetting agent,
10% of sodium sulfate, and
10% of trisodium monophosphate.

A 1% solution of this mixture can be used for cleaning milk cans.

The wetting agent of Example 5 is sold under the trademark "ARCOPAL N/O 60" of Farbwerke Hoechst. It is a nonyl phenyl polyglycol ether with 6 moles of ethylene oxide for each mole of nonyl phenol.

EXAMPLE 6:

40% of trisodium citrate,
15% of one of the compounds of Examples 1 or 2 according to the present invention,
5% of antifoaming agent,
40% of sodium gluconate.

0.2% of this mixture are added to a 1.5% of sodium hydroxide solution. The solution can be used for cleaning bottles, especially for cleaning bottles equipped with aluminum parts.

Of course, other conventional antifoaming agents than that disclosed in Example 3 as well as other wetting agents than that disclosed in Example 5 can be used for the purpose of the present invention.

It may be mentioned that the compounds according to the present invention are also excellent complexing agents for metal ions. Thus, for instance, the complexing power with respect to calcium ions has been determined. It was found that the compound of Example 1 has a considerably better complexing power than the comparable isomeric compound of Formula V.

Likewise, the compound of Formula III according to the present invention, i.e. the compound of Example 2, has a considerably better complexing power than the isomeric compound of Formula VI. The following comparative tests have been carried out in order to determine the complexing power of these compounds with respect to calcium ions:

1 g. of the compund to be tested is dissolved in 7 ml. of distilled water. The pH-value of said solution is adjusted to a pH of 11.5 by the addition of N sodium hydroxide solution while stirring. 10 ml. of a 2% sodium carbonate solution are added to the resulting clear solution. An 0.25 molar calcium acetate solution is then added drop by drop to said complexing solution until permanent turbidity is evident. During the addition the pH-value is maintained at a pH of 11.5.

The complexing power for calcium carbonate corresponds to the consumption of calcium acetate solution multiplied by 25.

The calcium complexing power (moles calcium for each mole of compound) is equal to the consumption of calcium acetate solution $\times$ 25 $\times$ molecular weight of the compound $\times 10^{-5}$.

TABLE 2

| Calcium complexing power | | | | |
|---|---|---|---|---|
| Substance | Molecular weight | Consumption | Calcium carbonate complexing power | Mole calcium acetate for each mole of compound |
| Compound of Example 1 according to the invention | 316 | 7.0 | 175.0 | 0.55 |
| Isomeric compound of Formula V | 316 | 2.9 | 72.5 | 0.23 |
| Compound of Example 2 according to the invention | 272 | 33.0 | 825.0 | 2.24 |
| Isomeric compound of Formula VI | 272 | 3.5 | 87.5 | 0.25 |
| Cyclohexane pentacarboxylic acid | 304 | 26.5 | 662.5 | 2.01 |

The polycarboxylic acid of Formula II (Example 1) has been designated hereinabove and in the claims annexed hereto either as 1,4-bis-formyl cyclohexane-1,2,3,6-tetracarboxylic acid or as 1,4-bis-formyl cyclohexane-2,3,4,5-tetracarboxylic acid.

The polycarboxylic acids according to the present invention can be employed as such or in the form of their watersoluble salts, especially their alkali metal salts, their ammonium salts, or their salts with organic amines, for instance, with ethanolamine, and the like. Example 5 discloses the use of the sodium salts of the polycarboxylic acids of examples 1 and 2. In place of said sodium salts there can, of course, also be used their water-soluble ammonium salts or salts with organic amines.

We claim:

1. A 1,4-bis-formyl cyclohexane polycarboxylic acid of the Formula

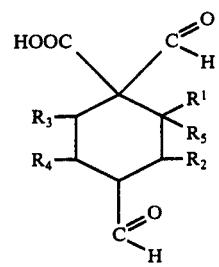

in which $R_1$, $R_2$, $R_3$, and $R_4$ are hydrogen or the carboxyl group, at least one of the substituents $R_1$, $R_2$, $R_3$, and $R_4$ being a carboxyl group, and $R_5$ is hydrogen or the methylene carboxyl group (—CH$_2$—COOH).

2. The compound of claim 1, in which $R_1$, $R_2$, and $R_3$ are carboxyl groups while $R_4$ and $R_5$ are hydrogen, said compound being the 1,4-bis-formyl cyclohexane-1,2,3,6-tetracarboxylic acid of the Formula

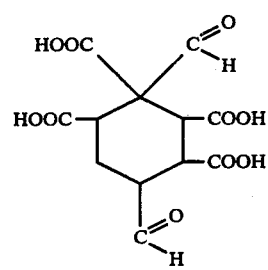

3. A composition for preventing scale formation in aqueous media, consisting essentially of the 1,4-bis-formyl cyclohexane polycarboxylic acid of claim 2 as active scale formation preventing agent.

4. The compound of claim 1, in which $R_1$ and $R_2$ are carboxyl groups, while $R_3$, $R_4$, and $R_5$ are hydrogen, said compound being 1,4-bis-formyl cyclohexane-1,2,3-tricarboxylic acid of the Formula

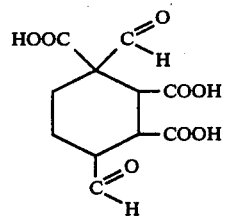

5. A composition for preventing scale formation in aqueous media, consisting essentially of the 1,4-bis-formyl cyclohexane polycarboxylic acid of claim 4 as active scale formation preventing agent.

6. The compound of claim 1, in which $R_1$ and $R_3$ are carboxyl groups, $R_2$ and $R_4$ are hydrogen, and $R_5$ is the methylene carboxyl group (—CH$_2$—COOH), said compound being 1,4-bis-formyl-1,2,6-tricarboxy-2-methylene carboxylic acid of the formula

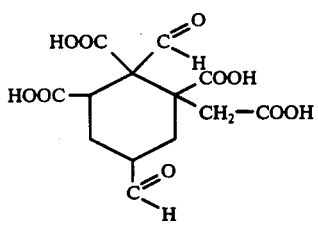

7. The water-soluble salts of the compounds of claim 1, said salts being selected from the group consisting of alkali metal salts, ammonium salts, and salts with organic amines.

8. A composition for preventing scale formation in aqueous media, consisting essentially of a 1,4-bis-formyl cyclohexane polycarboxylic acid of claim 1 as active scale formation preventing agent.

9. In a method of washing, cleansing, and rinsing articles, the steps which comprise adding to a washing, cleansing, and rinsing agent the 1,4-bis-formyl cyclohexane polycarboxylic acid of claim 1 in an amount sufficient to act as active scale formation preventing agent and washing, cleansing, and rinsing articles with the resulting mixture.

10. In a method of washing, cleansing, and rinsing articles, the steps which comprise adding to a washing, cleansing, and rinsing agent a water-soluble salt of the 1,4-bis-formyl cyclohexane polycarboxylic acid of claim 1 in an amount sufficient to act as active scale formation preventing agent and washing, cleansing, and rinsing articles with the resulting mixture.

11. In a process of producing a 1,4-bis-formyl cyclohexane polycarboxylic acid of the Formula

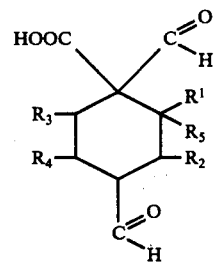

in which
$R_1$, $R_2$, $R_3$, and $R_4$ are hydrogen or the carboxyl group, at least one of the substituents $R_1$, $R_2$, $R_3$, and $R_4$ being a carboxyl group, and
$R_5$ is hydrogen or the methylene carboxyl group ($-CH_2-COOH$),
said process comprising the steps of oxidizing a compound of the Formula

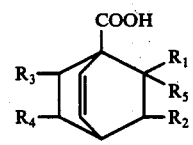

in which
$R_1$, $R_2$, $R_3$, and $R_4$ are hydrogen or the carboxyl group and at least one of the substituents $R_1$, $R_2$, $R_3$, and $R_4$ being a carboxyl group, and
$R_5$ is hydrogen or the methylene carboxyl group ($-CH_2-COOH$),
or the anhydride of said compound with two neighboring carboxyl groups being present in the form of their anhydride, said oxidation being effected by heating said compound with 40% to 68% nitric acid at a temperature between 60° and 100° C. in the absence of a catalyst so as to yield said 1,4-bis-formyl cyclohexane polycarboxylic acid.

* * * * *

UNITED STATES PATENT OFFICE
CERTIFICATE OF CORRECTION

Patent No. 4,043,930                    Dated August 23, 1977

Inventor(s) FRIEDRICH KRUEGER, DIETER PALLEDUHN

It is certified that error appears in the above-identified patent and that said Letters Patent are hereby corrected as shown below:

Column 3, lines 1 to 10: The compound should be designated by the Roman numeral -- IV --.

Column 4, lines 1 to 10: The compound should be designated by the Roman numeral -- V --.

Column 5, line 48: "in" should read -- as --.

line 49: "40" should read -- 40% --.

line 54: "of 30 ml." should read -- to 30 ml. --.

Column 7, line 7: "The" should read -- the --.

line 7: "of" should be cancelled.

Column 9, line 13: "almost" should read -- after --.

Signed and Sealed this

Twenty-second Day of November 1977

[SEAL]

Attest:

RUTH C. MASON
Attesting Officer

LUTRELLE F. PARKER
Acting Commissioner of Patents and Trademarks